June 3, 1958 H. W. ADAMSON 2,837,292
AUTOMATIC TAKE-UP DEVICE
Filed Feb. 9, 1955
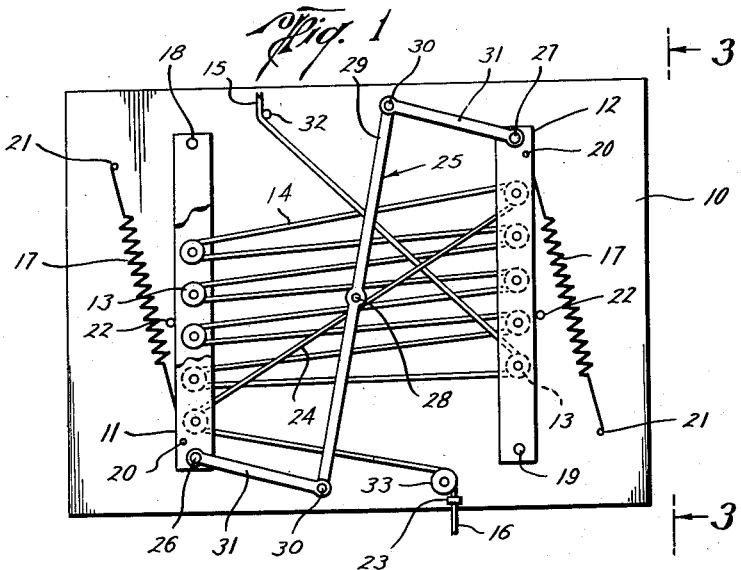
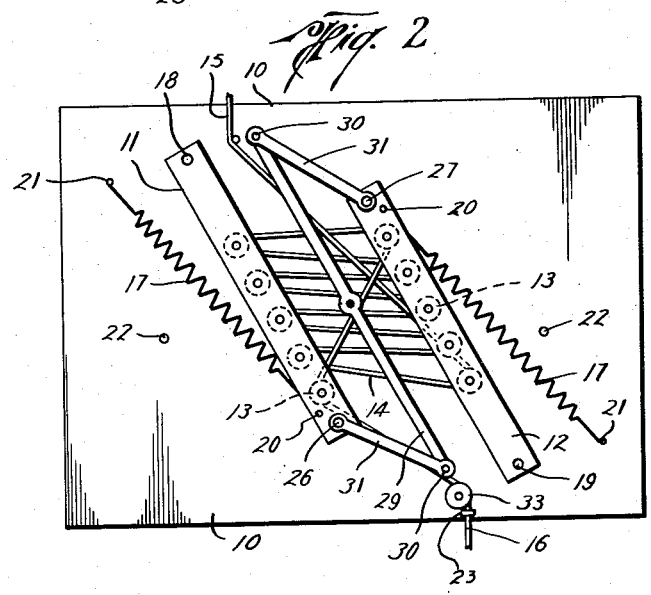
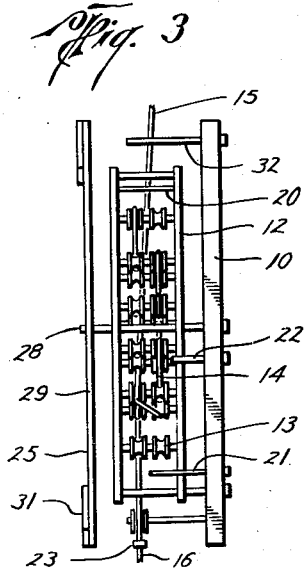
Harley W. Adamson
INVENTOR.
BY
ATTORNEYS

United States Patent Office 2,837,292
Patented June 3, 1958

2,837,292

AUTOMATIC TAKE-UP DEVICE

Harley W. Adamson, Houston, Tex.

Application February 9, 1955, Serial No. 487,037

8 Claims. (Cl. 242—47.5)

This invention relates to an improved device for automatically taking up slack in a line and maintaining tension upon an object which may be attached to and payed out on the line.

A device of this general type is capable of many and varied industrial uses. For example, it is useful in taking up the slack in a compressed air hose or the like as the valve on the end of the hose is moved about with respect to its point of application. Also, a need for an automatic take-up device frequently arises in connection with electrical cable which, if left in payed out position, might present a distinct safety hazard. Still further, it is contemplated that apparatus of this type would be useful in maintaining tension upon rapidly moving objects for gradually dissipating the energy thereof. As an example, two such devices as are to be described may be located at opposite sides of the deck of an aircraft carrier with a line strung therebetween in position to be engaged by landing aircraft. It will be understood, of course, that the above are examples only and in no way limiting upon the concepts of this invention.

It is an object of this invention to provide a device of this type which is capable of handling a greater length of line than other such devices of comparable size.

Another object is to provide such a device which is uniformly operable and not subject to binding or other malfunction during paying out or taking up of the line.

A further object is to provide such a device in which tension on the object may be maintained substantially constant regardless of the degree of pay-out.

A still further object is to provide tension maintaining apparatus of a type having line strung between pulleys, in which the line is arranged in a manner to provide maximum mechanical advantage.

Other objects, advantages and features of this invention will be apparent to one skilled in the art upon a consideration of the written specification, the attached claims and the annexed drawing.

In the drawing, wherein like reference characters are used throughout to designate like parts:

Fig. 1 is a top or elevational view of an illustrative embodiment of the device of the present invention prior to the line being payed out;

Fig. 2 is a view similar to Fig. 1, but in which the line has been payed out and the object attached thereto is under tension; and Fig. 3 is a side view of the device taken substantially along broken line 3—3 of Fig. 1.

Turning now to a detailed description of the drawing, it can be seen that the take-up device comprises a support 10 upon which are mounted a pair of arms 11 and 12 movable from a first spaced apart position, as shown in Fig. 1, to a second position more nearly adjacent one another, as shown in Fig. 2. As can be seen from the side view of Fig. 3, each arm comprises a pair of spaced apart members for supporting a series of vertically arranged pulleys or sheaves 13 therebetween. A line 14, having one end 15 adapted to be fixedly located and an opposite end 16 for attachment to the object (not shown) upon which tension is to be maintained, is strung between the pulleys of the spaced arms, such that it is payed out in the second position of the device (Fig. 2). Means, designated in entirety by the numeral 17, are provided for urging each of the arms toward the afore-mentioned first position, in a manner to be described hereinafter.

The support 10 may comprise a portable or removable backing which may be mounted in any desired position, such as horizontally, vertically, and with the arms 11 and 12 facing either downwardly or upwardly. On the other hand, the support 10 may merely comprise a wall, floor, ceiling or other backing from which the line is to be payed out. As will be appreciated from the foregoing remarks, the line 14 may be a hose, a cable, a rope, or similar flexible member to which the object upon which tension is to be maintained is attached.

In this connection, of course, the particular nature of the line will depend upon the object, but in any case the end 15 of the line is fixedly attached such that tension is maintained on the article as the line is payed out. For example, in the afore-mentioned example in which the line 14 may be a hose for compressed air, the end 15 would be connected to the source of compressed air and the end 16 attached to a valve or other means from which the compressed air may be applied as desired. In this environment, a substantially constant tension would be maintained upon the hose as the valve was moved from place to place and, upon completion of its use, the released line would be automatically taken up by the device of this invention.

Each of the arms 11 and 12 is pivotally mounted on the support for swinging movement between the first and second positions of Figs. 1 and 2, respectively. More particularly, the arm 11 is pivotally mounted upon pin 18 toward one end of said arm, and arm 12 is pivotally mounted from the support by pin 19 disposed toward an end of the last-mentioned arm. The pins 18 and 19 are located at opposite ends of the spaced arms such that in swinging to the second position of Fig. 2 the free ends of such arms are brought toward one another upon counterclockwise movement, as seen from the drawing. With urging means 17 connected as shown between each arm and the support by pins 20 and 21, respectively, it will be understood that swinging of the arms to the second position is resisted by such urging means such that the object upon the free end 16 of the line is placed under tension.

This urging means 17 may comprise, as shown, a tension coil spring or, if desired, a pneumatic or hydraulic plunger, a counterbalance, or similar mechanism for urging each arm to the position shown in Fig. 1. A resilient means is preferred inasmuch as it will not only maintain tension upon the object during paying out but will also automatically return it to its original position upon release. It will be noted that the urging means is not only located in a manner to urge the arms 11 and 12 to the first position, but is particularly located so that the tension maintained upon the object as the device is payed out is substantially constant or uniform. This advantage is accomplished by extending the urging means adjacent its respective arm such that it acts in a direction substantially parallel to the arm. In this manner, the effective length through which the urging means acts is maintained substantially uniform, rather than being extended a considerable degree upon movement of the device to the payed out or second position.

The first position of the device as shown in Fig. 1 is preferably defined by means of stops 22 on the support in position to engage the arms when they are disposed a maximum distance apart. In this manner, a maximum length of line is accommodated by the device when the arms are collapsed or moved more adjacent one another in the second position shown in Fig. 2. If desired, however, a stop may be provided by means of a knot or other enlargement upon the end 16 of the line in position to engage a bracket or support guide 23 when the arms 11 and 12 are disposed as shown in Fig. 1. Such a knot or enlargement is not shown on the drawing inasmuch as its use would be alternative to the use of the stops 22.

The number and arrangement of the pulleys or sheaves 13 is merely illustrative, and, in fact, equivalent friction reducing elements may be used for supporting the line 14. For example, the number of sheaves may be increased multifold depending upon the size of the device and the length of line to be accommodated. Also, it will be obvious that the pulleys could be pivotally carried transversely of the support rather than parallel thereto, and such an arrangement is contemplated by this invention.

The line 14 may be strung between pulleys upon the spaced arms in a number of different ways. However, the arrangement shown is preferred inasmuch as it provides the device with added mechanical advantage due to portion 24 of the line adjacent the end 16 which extends between the pulleys on the spaced arms which are located toward the free ends of the arms. In this manner, a force is directed substantially perpendicularly to the arms during a major portion of their movement between the first and second positions. With this arrangement of the line, it is preferred to provide each arm with a pair of vertical rows of pulleys such that the line may be crossed upon itself, as shown in the drawing, without frictional binding which would otherwise interfere with the operation of the device.

According to another novel concept of this invention, there is provided a means for insuring that the arms 11 and 12 of the device move parallel to one another during operation and thus prevent any binding or other malfunction as the line is either payed out or taken up. The means provided for this purpose comprises an articulated bar 25 pivotally connected by pins 26 and 27 toward the free ends of the arms 11 and 12, respectively. Also, this bar, which may be termed an equalizer, is pivotally connected at an intermediate point to the support 10 by means of pin 28 positioned so as to avoid binding with the line 14. The bar 25 is made up of a center section 29 pivotally mounted on the pin 28 and pivotally connected at opposite ends by pins 30 to end sections 31 which are, in turn, pivotally connected to the arms 11 and 12 by means of the afore-mentioned pins 26 and 27, respectively. As shown in Fig. 1, in the first position of the device, the length of the sections 29 and 31 are such that pins 30 are disposed above pins 27 and 26 so as to prevent locking of the equalizer during movement between the first and second positions. The operation and function of the bar 25 is obvious and, therefore, will not be described in greater detail.

The fixedly located end 15 of the line 14 is preferably guided by a pin 32 on the support so as to extend into the lowermost pulley or sheave of the arm 12 in the manner shown in Fig. 1. Also, the free end 16 for attachment to the object upon which tension is to be maintained may be guided over a roller or similar guide 33 on the support for direction into the bracket 23.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. An automatic take-up device, comprising a support, a pair of arms pivotally mounted on the support for swinging movement from a first spaced apart position, wherein said arms are disposable in a parallel relation, to a second position more nearly adjacent one another, connecting means for maintaining said parallel relation during movement to said second position, pulleys on the arms for stringing a line therebetween and means urging the arms toward the first position.

2. An automatic take-up device, comprising a support, a pair of arms pivotally connected toward one end to the support for swinging movement from a first spaced apart and substantially parallel position to a second position more nearly adjacent one another, pulleys on the arms for stringing a line therebetween, means connected to the arms toward their opposite ends for urging said arms to the first position, and additional means connecting said opposite ends of the arms together for maintaining their parallel relation during movement from the first to the second position.

3. A device of the character defined in claim 2, wherein said additional means comprises an articulated bar pivotally connected at its opposite ends to said arms and to the support intermediate said opposite ends.

4. A device of the character defined in claim 2, including stops on the support to prevent movement of said arms due to said urging means beyond the first position.

5. A device of the character defined in claim 2, wherein said urging means comprises resilient means connected between each arm and the support so as to act in a path substantially parallel to such arm.

6. Apparatus for maintaining tension upon an object, comprising a pair of arms pivotally mounted on a support for swinging movement from a first spaced apart position to a second position more nearly adjacent one another, means connected to the arms for resiliently urging them to the first position, a series of pulleys on each arm, and a line having one end adapted to be fixedly located and the other end attachable to the object upon which tension is to be maintained, the intermediate portion of the line being strung over the pulleys in a manner to move the arms toward the second position upon paying out of the line.

7. Apparatus of the character defined in claim 6, wherein each arm is pivotally mounted toward one end and the intermediate portion of the line adjacent that end of the line attachable to the object is strung between pulleys toward the opposite ends of the arms.

8. An automatic take-up device comprising a support, a pair of arms pivotally connected toward one end to the support for swinging movement from a first spaced apart and substantially parallel position to a second position more nearly adjacent to one another, pulleys on the arms for stringing a line therebetween, and means connected to the arms toward their opposite ends for urging said arms to the first position.

References Cited in the file of this patent

UNITED STATES PATENTS

| | | |
|---|---|---|
| 588,374 | Bean et al. | Aug. 17, 1897 |
| 1,142,531 | Royle | June 8, 1915 |
| 1,375,568 | Cunniff | Apr. 19, 1921 |
| 1,940,702 | Shope | Dec. 26, 1933 |
| 2,171,741 | Cohn | Sept. 5, 1939 |

FOREIGN PATENTS

| | | |
|---|---|---|
| 545,845 | France | Aug. 2, 1922 |
| 741,807 | Germany | Nov. 17, 1943 |